US008973993B2

(12) United States Patent
Hall

(10) Patent No.: US 8,973,993 B2
(45) Date of Patent: Mar. 10, 2015

(54) CONFIGURABLE CUSHION SET FOR A SEAT

(75) Inventor: Stuart Hall, Centreville, MD (US)

(73) Assignee: LME Inc., Annapolis, MD (US)

( * ) Notice: Subject to any disclaimer, the term of this patent is extended or adjusted under 35 U.S.C. 154(b) by 243 days.

(21) Appl. No.: 13/464,691

(22) Filed: May 4, 2012

(65) Prior Publication Data
US 2012/0280546 A1 Nov. 8, 2012

Related U.S. Application Data

(60) Provisional application No. 61/457,652, filed on May 6, 2011.

(51) Int. Cl.
A47C 7/42 (2006.01)
A47C 31/00 (2006.01)
B60N 2/66 (2006.01)
B60N 2/64 (2006.01)
B64D 11/06 (2006.01)
B60N 2/70 (2006.01)
B60N 2/44 (2006.01)

(52) U.S. Cl.
CPC ............... B60N 2/7005 (2013.01); B60N 2/66 (2013.01); B60N 2/4415 (2013.01); B64D 11/06 (2013.01); B64D 11/0689 (2013.01); B64D 2011/0682 (2013.01); Y10S 297/06 (2013.01)
USPC ............... 297/284.5; 297/284.6; 297/228.13; 297/219.1; 297/DIG. 6

(58) Field of Classification Search
USPC ............... 297/284.6, 228.13, 230.13, 230.14, 297/452.35, 284.5, 397, 219.1, DIG. 6
See application file for complete search history.

(56) References Cited

U.S. PATENT DOCUMENTS

| 3,279,849 | A | * | 10/1966 | Radke et al. ............... 297/284.5 |
| 3,974,827 | A | * | 8/1976 | Bodeen .................. 606/237 |
| 4,190,286 | A | * | 2/1980 | Bentley ..................... 297/284.3 |
| 4,382,306 | A | * | 5/1983 | Lickert .............................. 5/710 |
| 4,441,221 | A | * | 4/1984 | Enste et al. ....................... 5/657 |
| 4,516,568 | A | * | 5/1985 | Baxter et al. .................. 606/237 |
| 4,518,200 | A | * | 5/1985 | Armstrong ................. 297/284.6 |
| 4,580,837 | A | * | 4/1986 | Bayley ..................... 297/362.12 |
| 4,690,456 | A | * | 9/1987 | Chiba et al. ................ 297/284.6 |
| 4,726,624 | A | * | 2/1988 | Jay ........................... 297/452.25 |
| 4,759,543 | A | * | 7/1988 | Feldman ....................... 482/148 |
| 4,789,202 | A | * | 12/1988 | Alter ........................ 297/284.6 |

(Continued)

FOREIGN PATENT DOCUMENTS

GB 2178652 A * 2/1987 ............... A47C 7/42

*Primary Examiner* — David R Dunn
*Assistant Examiner* — Tania Abraham
(74) *Attorney, Agent, or Firm* — Foley & Lardner LLP

(57) ABSTRACT

A cushion set for use with a seat having a seat back with an upper portion and a lower portion includes an upper back cushion and a lower back cushion each having a forward surface and an opposing aft surface, each forward surface including at least one back cushion forward attachment device, and each aft surface including at least one back cushion aft attachment device; and an inflatable lumbar support having an aft surface that includes at least one lumbar support attachment device. The aft surface of the upper back cushion is attachable to the upper portion of the seat back, via the at least one back cushion aft attachment device of the upper back cushion. The aft surface of the lower back cushion is attachable to the lower portion of the seat back, via the at least one back cushion aft attachment device of the lower back cushion.

17 Claims, 16 Drawing Sheets

(56) References Cited

U.S. PATENT DOCUMENTS

| | | | | |
|---|---|---|---|---|
| 4,793,651 | A * | 12/1988 | Inagaki et al. | 297/180.11 |
| 4,824,169 | A * | 4/1989 | Jarrell | 297/284.1 |
| 4,876,755 | A * | 10/1989 | Parrish | 297/284.3 |
| 5,018,790 | A * | 5/1991 | Jay | 297/452.26 |
| 5,149,173 | A * | 9/1992 | Jay et al. | 297/284.9 |
| 5,154,477 | A * | 10/1992 | Lacy | 297/397 |
| 5,211,446 | A * | 5/1993 | Jay et al. | 297/440.2 |
| 5,310,245 | A * | 5/1994 | Lyszczasz | 297/219.12 |
| 5,331,698 | A * | 7/1994 | Newkirk et al. | 5/602 |
| 5,378,045 | A * | 1/1995 | Siekman et al. | 297/452.25 |
| 5,407,248 | A * | 4/1995 | Jay et al. | 297/284.1 |
| 5,533,787 | A * | 7/1996 | Xiang | 297/284.5 |
| 5,551,107 | A * | 9/1996 | Graebe | 5/654 |
| 5,647,637 | A * | 7/1997 | Jay et al. | 297/354.12 |
| 5,671,977 | A * | 9/1997 | Jay et al. | 297/452.24 |
| 5,809,582 | A * | 9/1998 | Lane | 4/254 |
| 5,860,699 | A * | 1/1999 | Weeks | 297/284.6 |
| 6,079,784 | A * | 6/2000 | Peachey | 297/284.5 |
| 6,158,808 | A * | 12/2000 | Margolis et al. | 297/330 |
| 6,299,248 | B1 * | 10/2001 | Gennaro et al. | 297/230.13 |
| 6,929,325 | B1 * | 8/2005 | Goelo | 297/219.1 |
| 6,951,367 | B1 * | 10/2005 | Dinnan | 297/228.12 |
| 7,093,898 | B2 * | 8/2006 | Ladron De Guevara | 297/284.6 |
| 7,472,956 | B2 * | 1/2009 | Makhsous et al. | 297/284.9 |
| 7,841,658 | B1 * | 11/2010 | Marble | 297/224 |
| 8,147,000 | B1 * | 4/2012 | Drake | 297/452.41 |
| 8,157,325 | B2 * | 4/2012 | Machael et al. | 297/284.6 |
| 2010/0289305 | A1 * | 11/2010 | Chen | 297/230.13 |
| 2011/0031790 | A1 * | 2/2011 | Smith, Sr. | 297/230.12 |

* cited by examiner

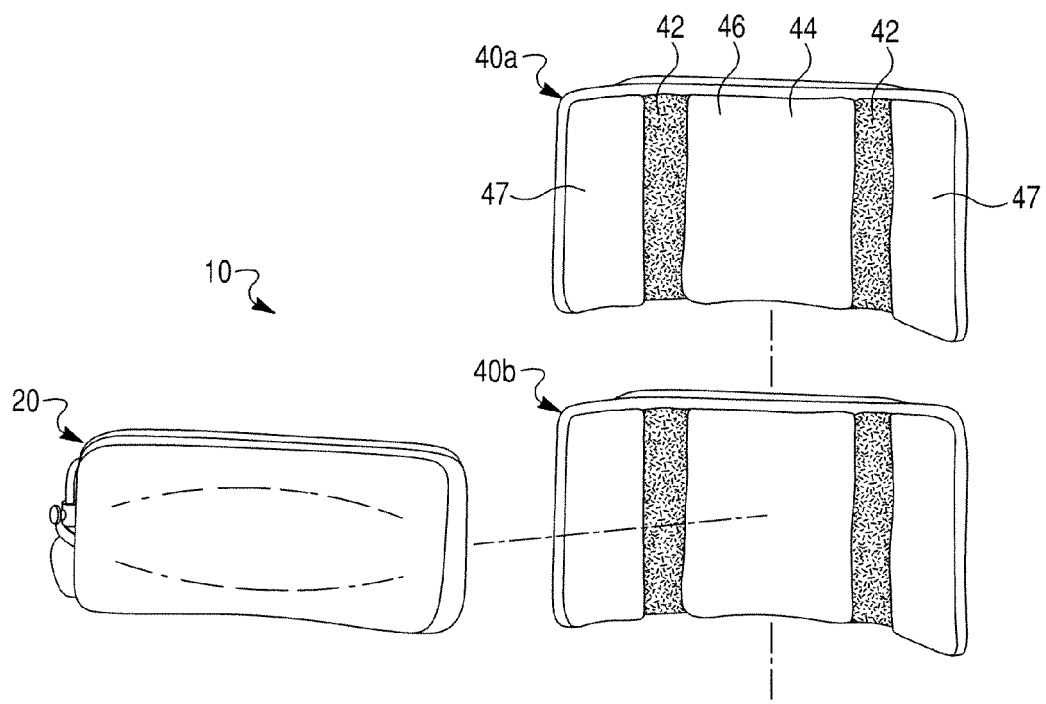

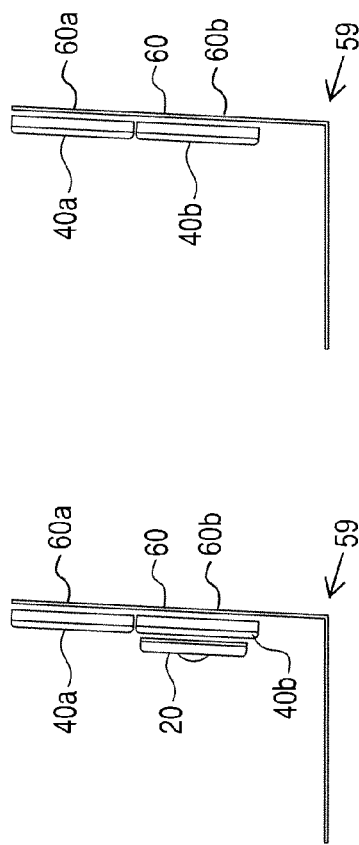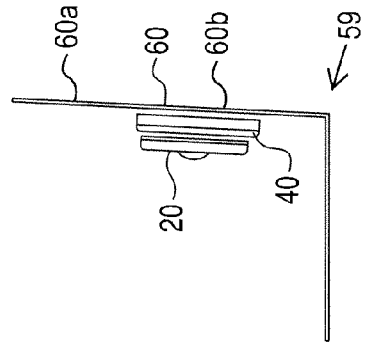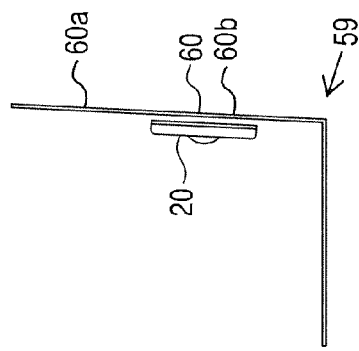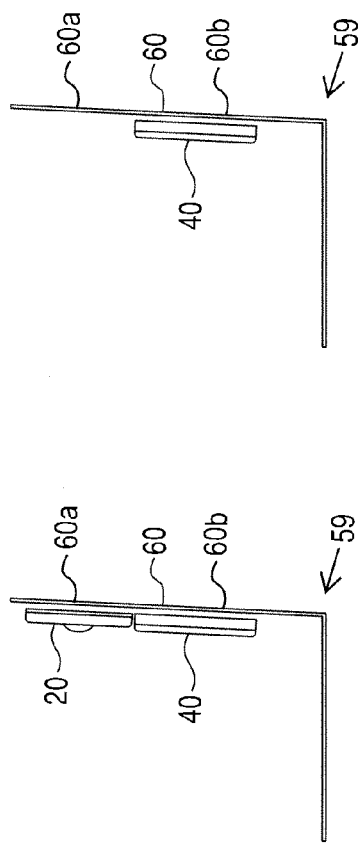

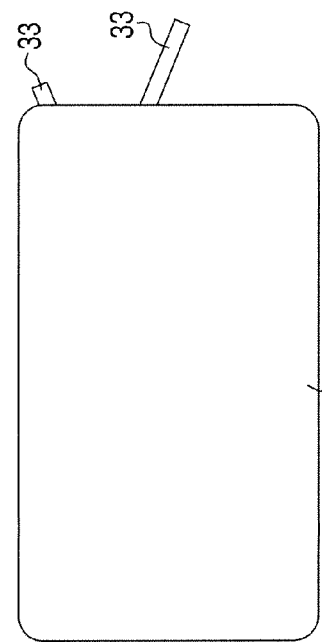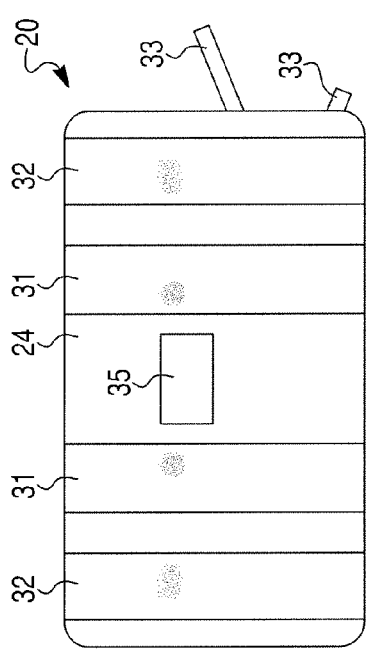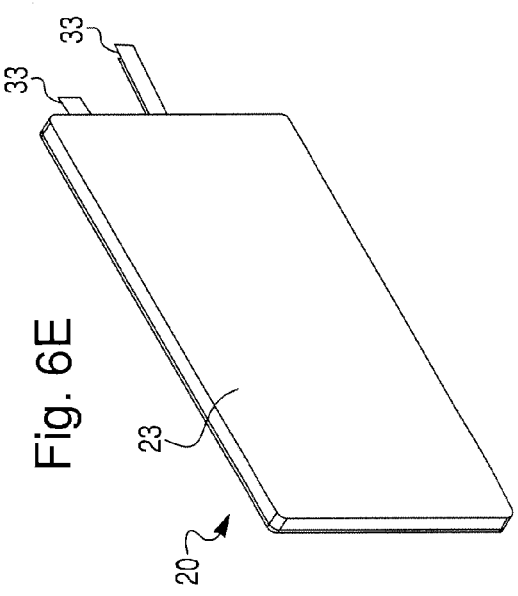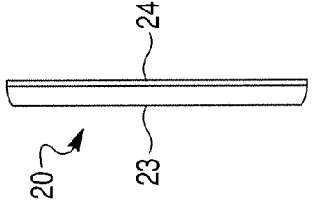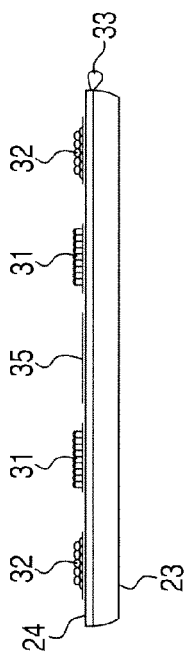

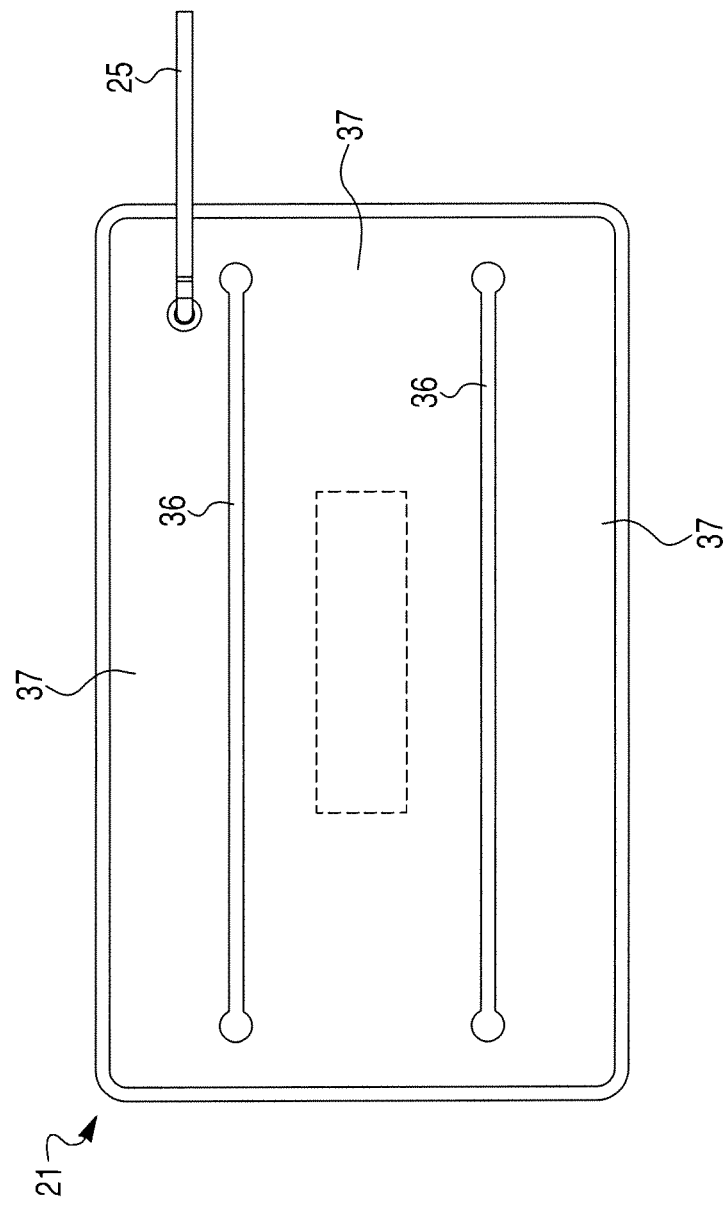

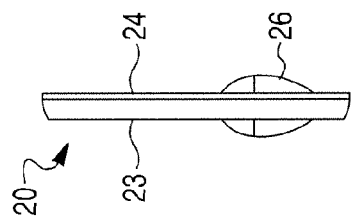
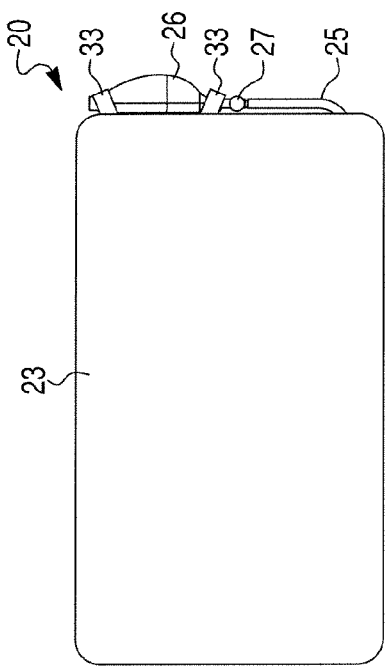
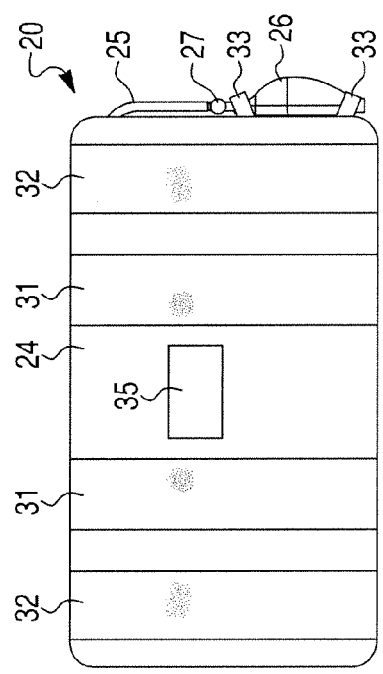
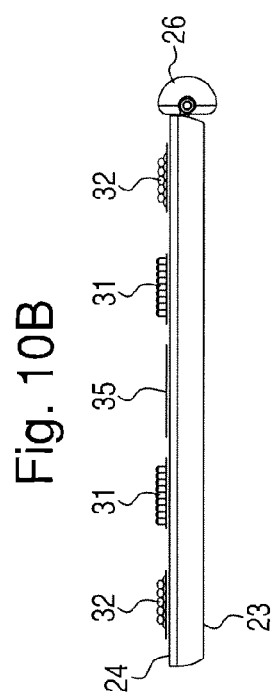

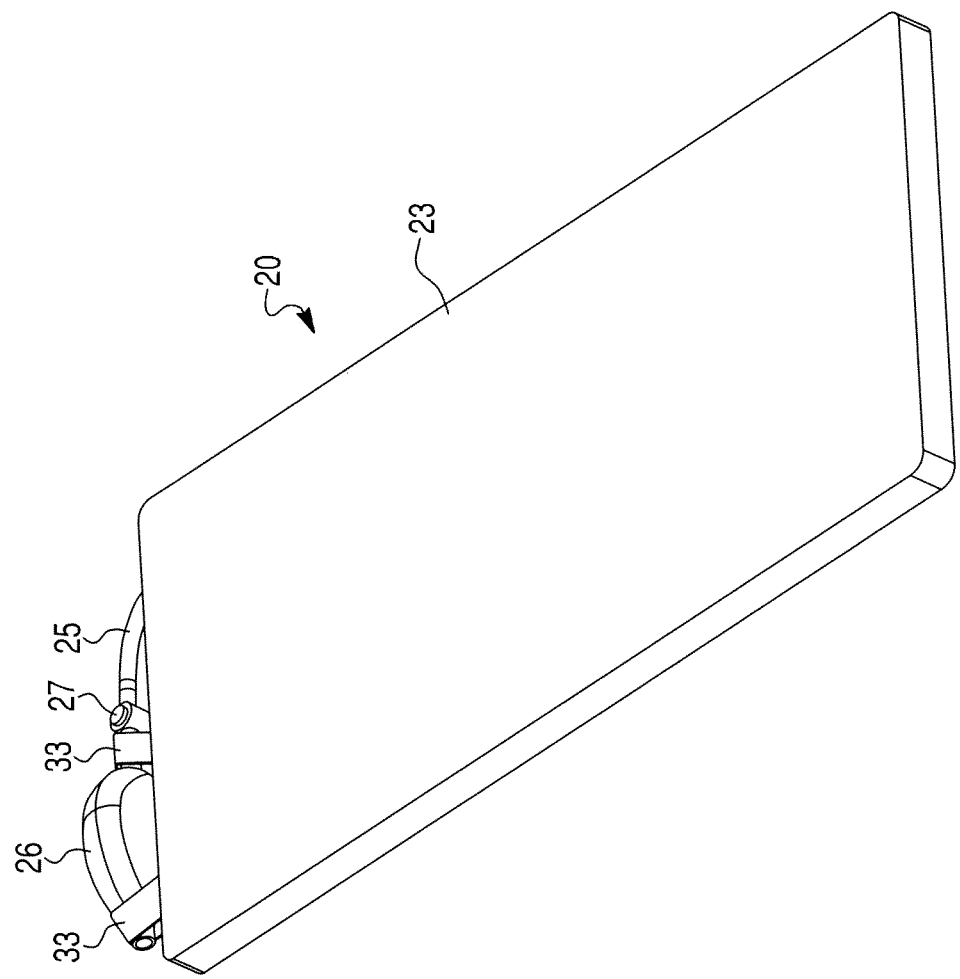

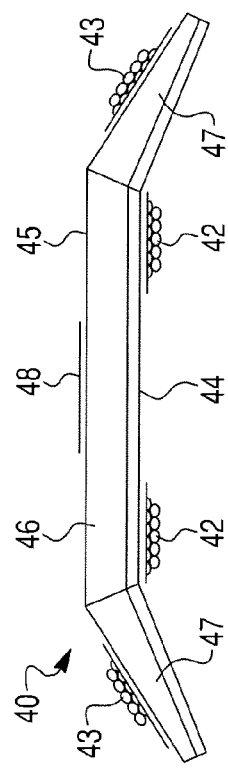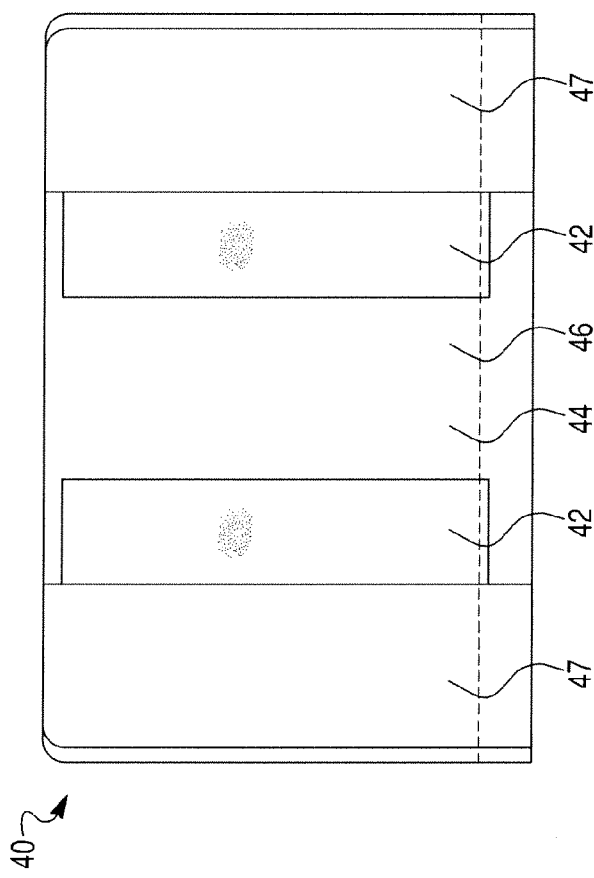

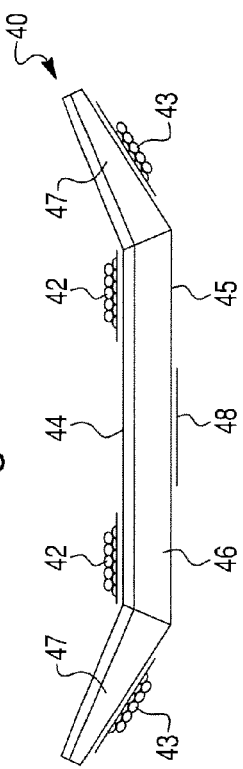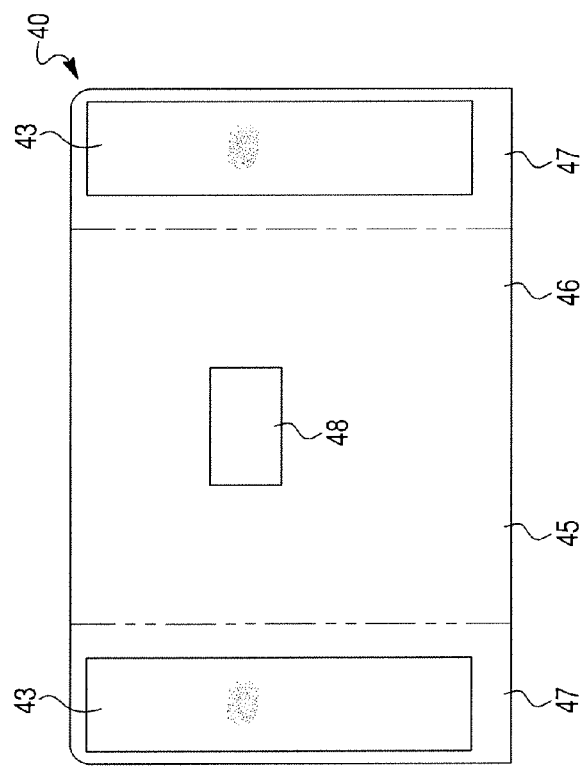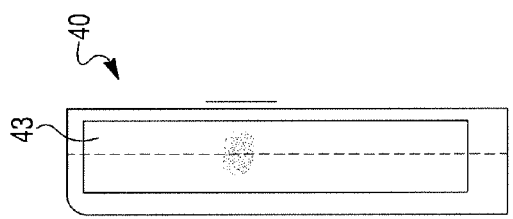

CONFIGURABLE CUSHION SET FOR A SEAT

This application claims priority to U.S. Provisional Patent Application No. 61/457,652, filed May 6, 2011. The contents of this application is incorporated herein by reference in its entirety.

BACKGROUND OF THE INVENTION

1. Field of the Invention

The present invention relates generally to the field seat cushions, and more particularly, to configurable seat cushions including at least an upper back cushion, a lower back cushion, and a lumbar support.

2. Description of Related Art

Seat back cushions are often used to maintain comfort and support for an individual while in the seated position. Adequate comfort and support are particularly important in an aircraft setting, such as a helicopter, where individuals must often be seated for long periods of time in confined spaces. Typically, seat cushion sets for helicopter seats include one large seat back cushion that is attached to the seat back, and one smaller lumbar support cushion that can be attached to the seat back cushion. FIG. 1A depicts a typical lumbar support 4. FIG. 1B depicts a typical lumbar support cover 5. FIG. 1C depicts a typical seat back cushion 6, which is designed so as to cover the entire seat back. The lumbar support 4 is attachable to the seat back cushion 6 using hook-and-loop fastening devices.

Typical seat cushion sets pose several problems. The lumbar support of typical cushion sets is not directly attachable to a seat back. Thus, individuals who do not wish to use the seat back cushion also cannot use the lumbar support. This is especially inconvenient for larger individuals who need the extra space that would be taken up by the thickness of the seat back cushion, but still wish to use the lumbar support. In addition, for military aircraft, crewmembers must often wear body armor on their upper bodies. Crewmembers wearing such body armor must either remove the body armor, or remove the back seat cushion to make more space for the back armor plates of the body armor. Again, because the lumbar support is not directly attachable to the seat back, these individuals are unable to use the lumbar support without the seat back cushion.

Thus, there is a need for improved cushion sets, and vehicle seats for use with such cushion sets.

SUMMARY OF THE INVENTION

According to one embodiment, a cushion set for use with a seat having a seat back with an upper portion and a lower portion comprises an upper back cushion and a lower back cushion each having a forward surface and an opposing aft surface, each of the forward surfaces of the back cushions comprising at least one back cushion forward attachment device, and each of the aft surfaces of the back cushions comprising at least one back cushion aft attachment device; and an inflatable lumbar support having an aft surface, the aft surface of the lumbar support comprising at least one lumbar support attachment device. The aft surface of the upper back cushion is attachable to and removable from the upper portion of the seat back, via the at least one back cushion aft attachment device of the upper back cushion. The aft surface of the lower back cushion is attachable to and removable from the lower portion of the seat back, via the at least one back cushion aft attachment device of the lower back cushion. The aft surface of the lumbar support is attachable to and removable from the forward surface of at least one of the upper back cushions, via the at least one lumbar support attachment device and the at least one back cushion forward attachment device. The aft surface of the lumbar support is attachable to and removable from at least one of the upper portion of the seat back and the lower portion of the seat back, via the at least one lumbar support attachment device.

In one embodiment, the cushion set is configurable in a first configuration, in which the upper back cushion is attached to the upper portion of the seat back, the lower back cushion is attached to the lower portion of the seat back, and the lumbar support is attached to the lower back cushion, and a second configuration, in which the lumbar support is attached directly to the lower portion of the seat back, without the upper back cushion and the lower back cushion.

In one embodiment, the cushion set is configurable in a third configuration, in which the upper back cushion is attached to the upper portion of the seat back, and the lower back cushion is attached to the lower portion of the seat back, without the lumbar support.

In one embodiment, the cushion set is configurable in a fourth configuration, in which the lower back cushion is attached to the lower portion of the seat back, and the lumbar support is attached to the lower back cushion, without the upper back cushion.

In one embodiment, the cushion set is configurable in a fifth configuration, in which the lower back cushion is attached to the lower portion of the seat back, and the lumbar support is attached directly to the upper portion of the seat back, without the upper back cushion.

In one embodiment, the cushion set is configurable in a sixth configuration, in which the lower back cushion is attached to the lower portion of the seat back, without the upper back cushion and the lumbar support.

In one embodiment, the upper back cushion and the lower back cushion each includes a central portion and two side portions, the side portions extending in a forward direction at a positive angle from a plane of the central portion.

In one embodiment, the at least one back cushion forward attachment device is located in the central portion of the upper back cushion or the lower back cushion, and the at least one back cushion aft attachment device comprises at least two back cushion aft attachment devices, at least one back cushion aft attachment device located in each of the side portions of the upper back cushion or the lower back cushion.

In one embodiment, the at least one lumbar support attachment device comprises a first lumbar support attachment device and a second lumbar support attachment device, the aft surface of the lumbar support is attachable to and removable from the forward surface of the at least one of the upper back cushions via the first lumbar support attachment device, and the aft surface of the lumbar support is attachable to and removable from the at least one of the upper portion of the seat back and the lower portion of the seat back via the second lumbar support attachment device.

In one embodiment, the first lumbar support attachment device comprises a strip of a hook side of a hook-and-loop fastener, and the second lumbar support attachment device comprises a strip of a loop side of a hook-and-loop fastener.

In one embodiment, the first lumbar support attachment device comprises a strip of a loop side of a hook-and-loop fastener, and the second lumbar support attachment device comprises a strip of a hook side of a hook-and-loop fastener.

In one embodiment, each of the attachment devices comprises a strip of a hook side or a look side of a hook-and-loop fastener.

In one embodiment, the strips are vertical strips.

In one embodiment, the lumbar support comprises an inflatable bladder and an inflatable lumbar support cover surrounding the inflatable bladder, the at least one lumbar support attachment device being disposed on an aft surface of the lumbar support cover.

In one embodiment, the lumbar support further comprises an inflation tube, an inflation bulb, and a valve connecting the inflation tube to the inflation bulb, the inflatable bladder being inflatable using the inflation bulb, and the lumbar support cover comprises at least one bulb attachment device configured to secure the bulb to the lumbar support cover.

In one embodiment, the upper back cushion and the lower back cushion each comprise a foam material and a back cushion cover surrounding the foam material, that at least one back cushion forward attachment device being disposed on a forward surface of the back cushion cover, and the at least one back cushion aft attachment device being disposed on an aft surface of the cover.

In one embodiment, a width of the lumbar support is substantially similar to a width of the lower back cushion.

In one embodiment, the upper back cushion and the lower back cushion have the same shape, size, and configuration.

In one embodiment, an apparatus comprises a seat back with an upper portion and a lower portion; an upper back cushion and a lower back cushion each having a forward surface and an opposing aft surface, each of the forward surfaces of the back cushions comprising at least one back cushion forward attachment device, and each of the aft surfaces of the back cushions comprising at least one back cushion aft attachment device; and an inflatable lumbar support having an aft surface, the aft surface of the lumbar support comprising at least one lumbar support attachment device. The aft surface of the upper back cushion is attachable to and removable from the upper portion of the seat back, via the at least one back cushion aft attachment device of the upper back cushion. The aft surface of the lower back cushion is attachable to and removable from the lower portion of the seat back, via the at least one back cushion aft attachment device of the lower back cushion. The aft surface of the lumbar support is attachable to and removable from the forward surface of at least one of the upper back cushions, via the at least one lumbar support attachment device and the at least one back cushion forward attachment device. The aft surface of the lumbar support is attachable to and removable from at least one of the upper portion of the seat back and the lower portion of the seat back, via the at least one lumbar support attachment device.

In one embodiment, an aircraft seating device comprises a seat portion disposed in the aircraft, such as a helicopter, the seat portion having a seat back with an upper portion and a lower portion; an upper back cushion and a lower back cushion each having a forward surface and an opposing aft surface, each of the forward surfaces of the back cushions comprising at least one back cushion forward attachment device, and each of the aft surfaces of the back cushions comprising at least one back cushion aft attachment device; and an inflatable lumbar support having an aft surface, the aft surface of the lumbar support comprising at least one lumbar support attachment device. The aft surface of the upper back cushion is attachable to and removable from the upper portion of the seat back, via the at least one back cushion aft attachment device of the upper back cushion. The aft surface of the lower back cushion is attachable to and removable from the lower portion of the seat back, via the at least one back cushion aft attachment device of the lower back cushion. The aft surface of the lumbar support is attachable to and removable from the forward surface of at least one of the upper back cushions, via the at least one lumbar support attachment device and the at least one back cushion forward attachment device. The aft surface of the lumbar support is attachable to and removable from at least one of the upper portion of the seat back and the lower portion of the seat back, via the at least one lumbar support attachment device.

BRIEF DESCRIPTION OF THE DRAWINGS

The accompanying drawings, which are incorporated in and constitute a part of this specification, illustrate various embodiments of the present invention, and together with the description, serve to explain the principles of the invention. In the drawings:

FIG. 4 is a front view of a back cushion set including an upper back cushion, a lower back cushion, and a lumbar supper, according to an embodiment of the present invention.

FIGS. 5A-5F are schematic side views of a cushion set attached to a seat back in various possible configurations, according to embodiments of the present invention.

FIGS. 6A-6D are various views of an inflatable lumbar support cover according to an embodiment of the present invention, FIG. 6A being a rear view, FIG. 6B being a top view, FIG. 6C being a side view, FIG. 6D being a front view, and FIG. 6E being a front, top perspective view.

FIG. 7 is a rear view of an inflatable lumbar support bladder according to an embodiment of the present invention.

FIGS. 10A-10E are various views of an inflatable lumbar support according to an embodiment of the present invention, FIG. 10A being a rear view, FIG. 10B being a top view, FIG. 10C being a side view, FIG. 10D being a front view, and FIG. 10E being a front, side perspective view.

FIGS. 11A-11E are various views of a back cushion according to an embodiment of the present invention, FIG. 11A being a top view, FIG. 11B being a front view, FIG. 11C being a side view, FIG. 11D being a bottom view, and FIG. 11E being a rear view.

DETAILED DESCRIPTION OF THE PREFERRED EMBODIMENTS

Figure 1A:
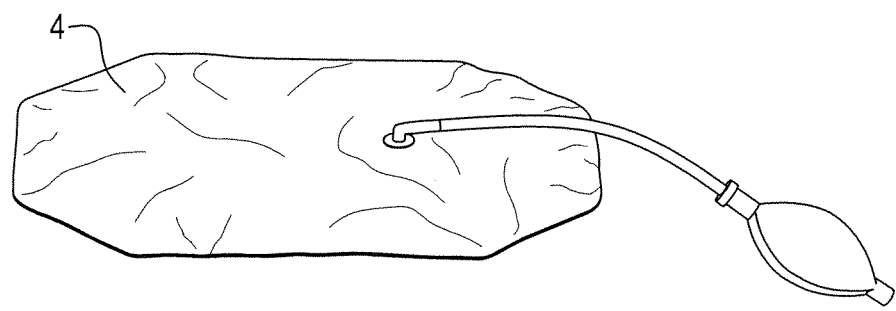
FIGS. 1A-1C are a front views of a typical lumbar support bladder (FIG. 1A), a typical lumbar support cover (FIG. 1B), and a typical back cushion (FIG. 1C).
Figure 1B:
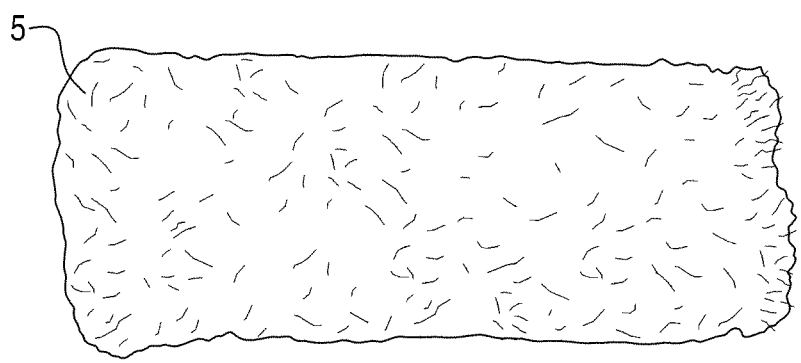
Figure 1C:
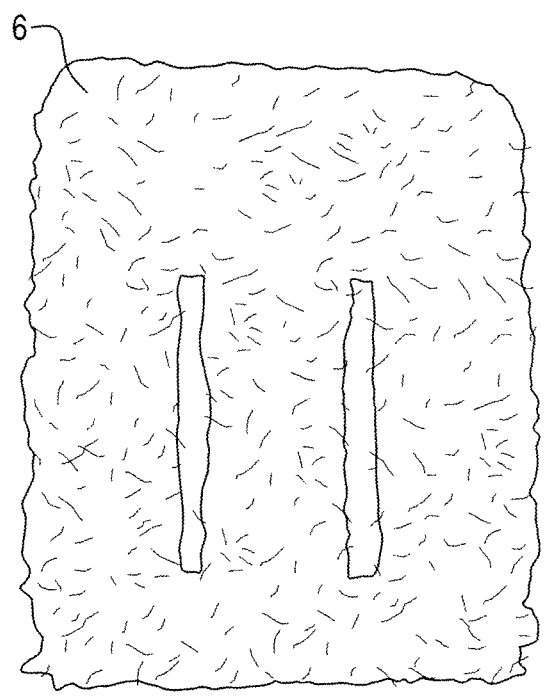

Embodiments of the disclosure will be described below with reference to the accompanying drawings. It should be understood that the following description is intended to describe exemplary embodiments, and not to limit the claimed subject matter. Wherever possible, the same reference numbers will be used throughout the drawings to refer to the same or like parts.

In one embodiment, a cushion set 10 for use with a seat 59 having a seat back 60 with an upper portion 60a and a lower portion 60b is provided. The upper portion 60a of the seat back 60 may be the portion that supports an individual's upper torso, and the lower portion 60b of the seat back 60 may be the portion that supports an individual's lower torso, as shown in FIGS. 5A-5F.

Figure 3:
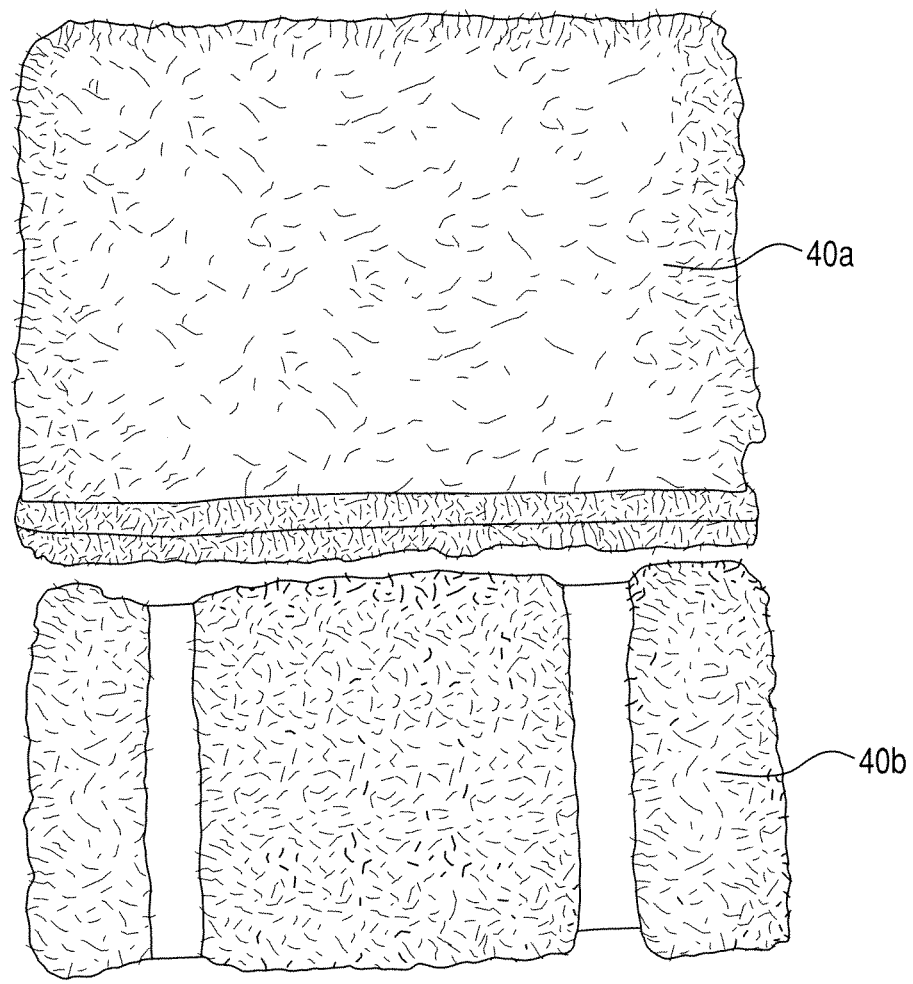
FIG. 3 is a front view of an upper back cushion and lower back cushion, according to an embodiment of the present invention.
Figure 12:
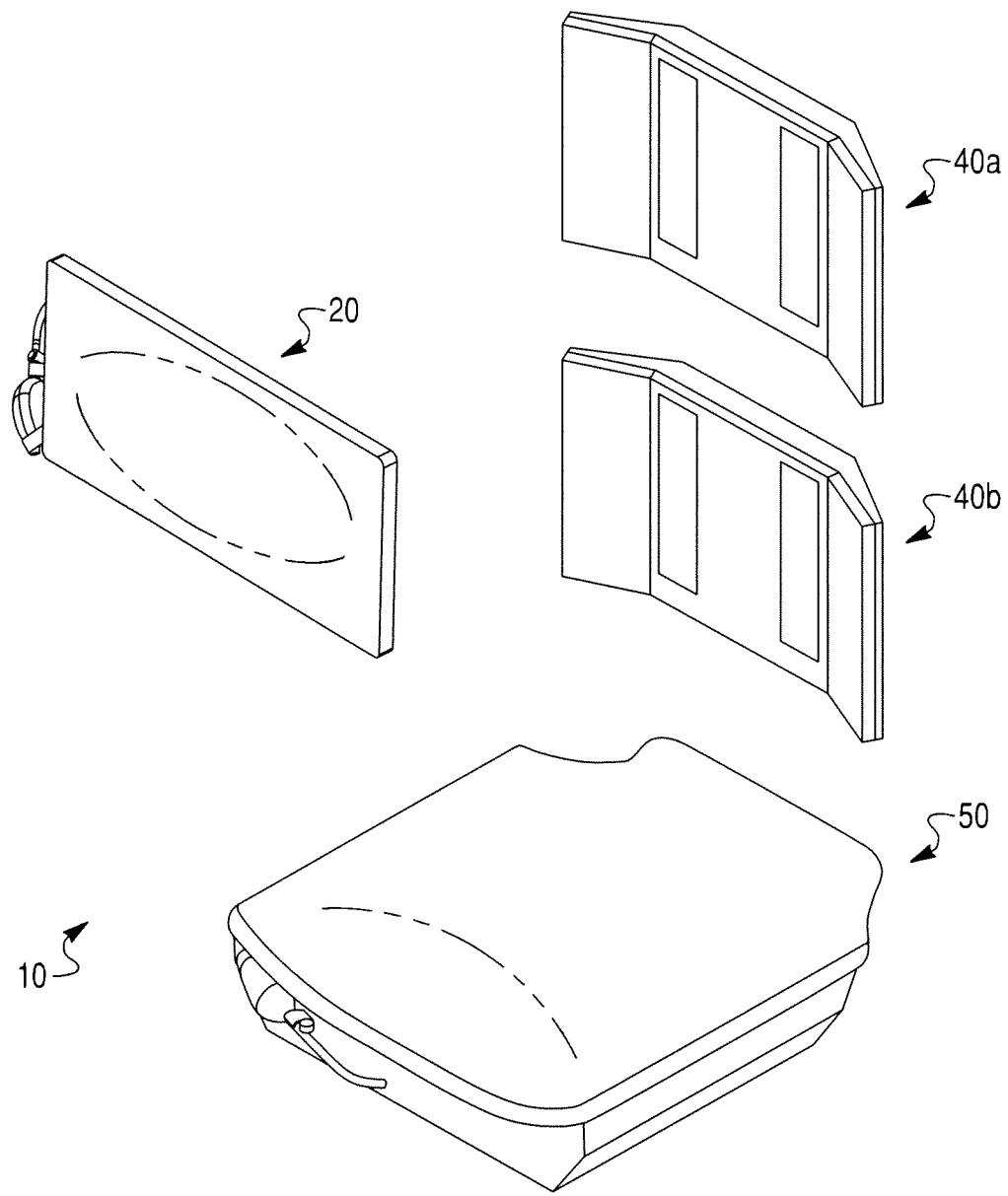
FIG. 12 is a front, top perspective view of a cushion set including an upper back cushion, a lower back cushion, an inflatable lumbar support, and a seat cushion.

The cushion set 10 may include two back cushions 40, including an upper back cushion 40a and a lower back cushion 40b, as shown, for example, in FIGS. 3, 4, and 12. The back cushions 40 may include a foam material surrounded by a back cushion cover. The back cushion cover may, for example, be made of a sheepskin or fabric material. The upper back cushion 40a and the lower back cushion 40b may have the same shape, size, and configuration.

The seat cushions 40 may include a forward surface (i.e., front surface) 44, and an opposing aft surface (i.e., rear surface), as shown, for example, in FIGS. 4 and 11A-11E. The seat cushions 40 may include a central portion 46 and two side portions 47. The side portions 47 may extend in the forward direction at a positive angle from a plane of the central portion 46, as shown, for example in FIG. 11A, such that the seat cushions 40 match a contour of the seat.

The forward surface 44 of the seat cushions 40 may include at least one attachment device 42 (termed the "back cushion forward attachment device"). The aft surface of an inflatable lumbar support may be attachable to and removable from the forward surface 44 of the seat cushions 40 via the back cushion forward attachment device 42, as discussed in more detail below. The back cushion forward attachment device 42 may be located in the central portion 46 of the back cushion 40. The back cushion 40 may include one or more of the back cushion forward attachment devices 42. For example, the back cushion 40 may include two forward attachment devices 42 in the central portion 46, one on the left side of the central portion 46 and one on the right side of the central portion 46, as shown in FIGS. 11A, 11B, and 11D.

The aft surface 45 of the seat cushions 40 may include at least one attachment device 43 (termed the "back cushion aft attachment device"). The upper back cushion 40a may be attachable to and removable from the upper portion 60a of a seat back 60 via the back cushion aft attachment device 43, as shown, for example, in FIG. 5A. The lower back cushion 40b may be attachable to and removable from the lower portion 60b of a seat back 60 via the back cushion aft attachment device 43. For example, the back cushion aft attachment device 43 may be a strip of either the hook side or the loop side of a hook-and-loop fastener (such as Velcro), as shown in FIGS. 11A and 11C-11E. The seat back may have a strip of the other side of the hook-and-loop fastener. The back cushion aft attachment device 43 may be located in the side portions 47 of the back cushion 40. The back cushions 40 may have one or more of the back cushion aft attachment devices 43. For example, the back cushions 40 may have two back cushion aft attachment devices 42, one on each of the side portions 47, as shown in FIGS. 11A, 11D, and 11E. The seat back 60 may have two corresponding seat back attachment devices.

Where the back cushion includes a back cushion cover, the attachment devices 42 and 43 may be located on the cover.

Figure 2A:
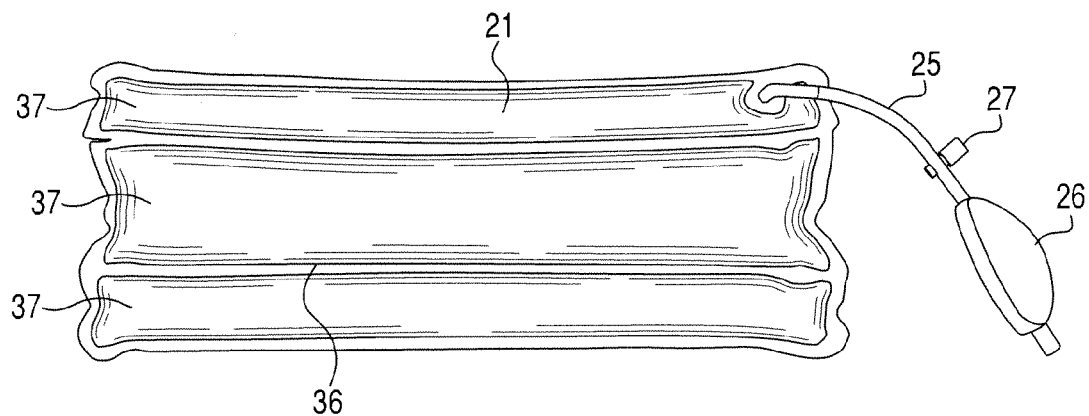
FIGS. 2A-2C are a front views of an inflatable lumbar support bladder (FIG. 2A), an inflatable lumbar support cover (FIG. 2B), and an inflatable lumbar support including the lumbar support bladder and lumbar support cover (FIG. 2C), according to an embodiment of the present invention.
Figure 2B:
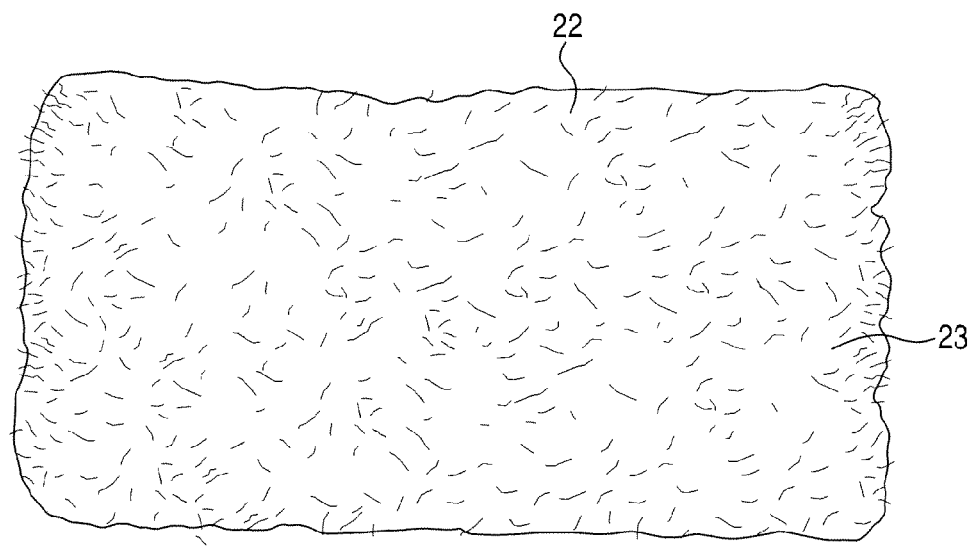
Figure 2C:
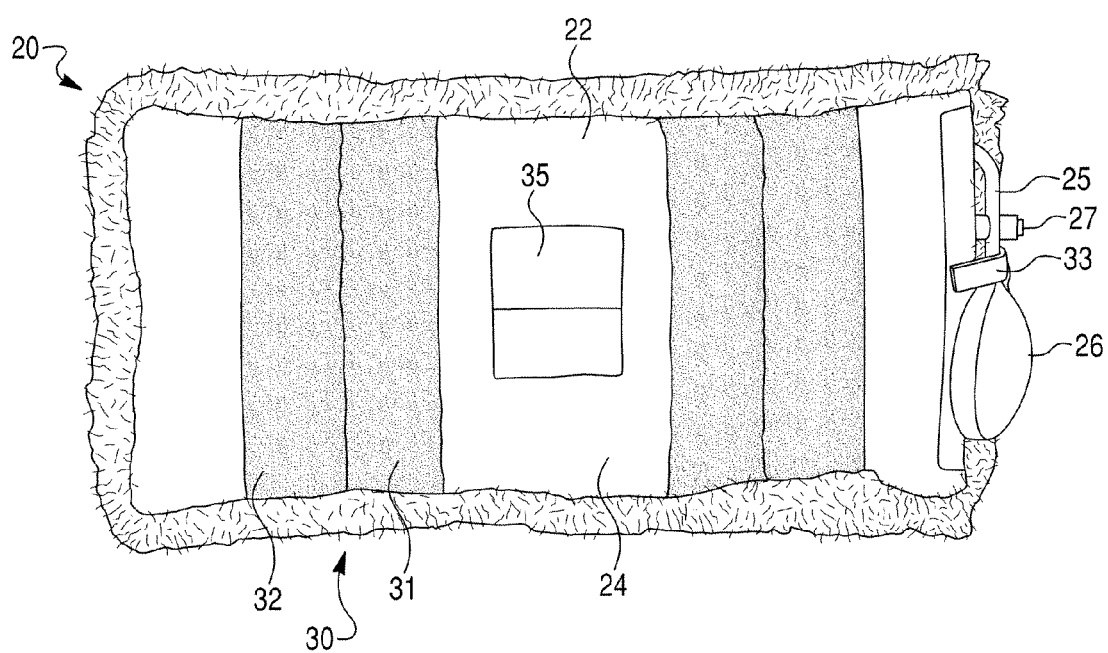
Figure 8A:
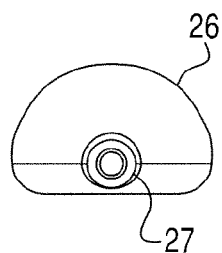
FIGS. 8A-8C are various views of an inflation bulb that can be used to inflate the lumbar support bladder, according to an embodiments of the present invention, FIG. 8A being a front view, FIG. 8B being a side view, and FIG. 8C being a front, top perspective view.
Figure 8B:
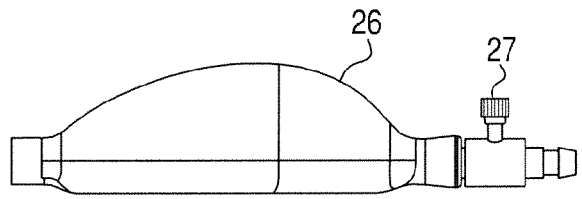
Figure 8C:
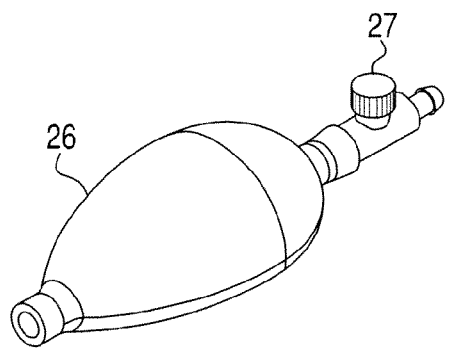
Figure 9:
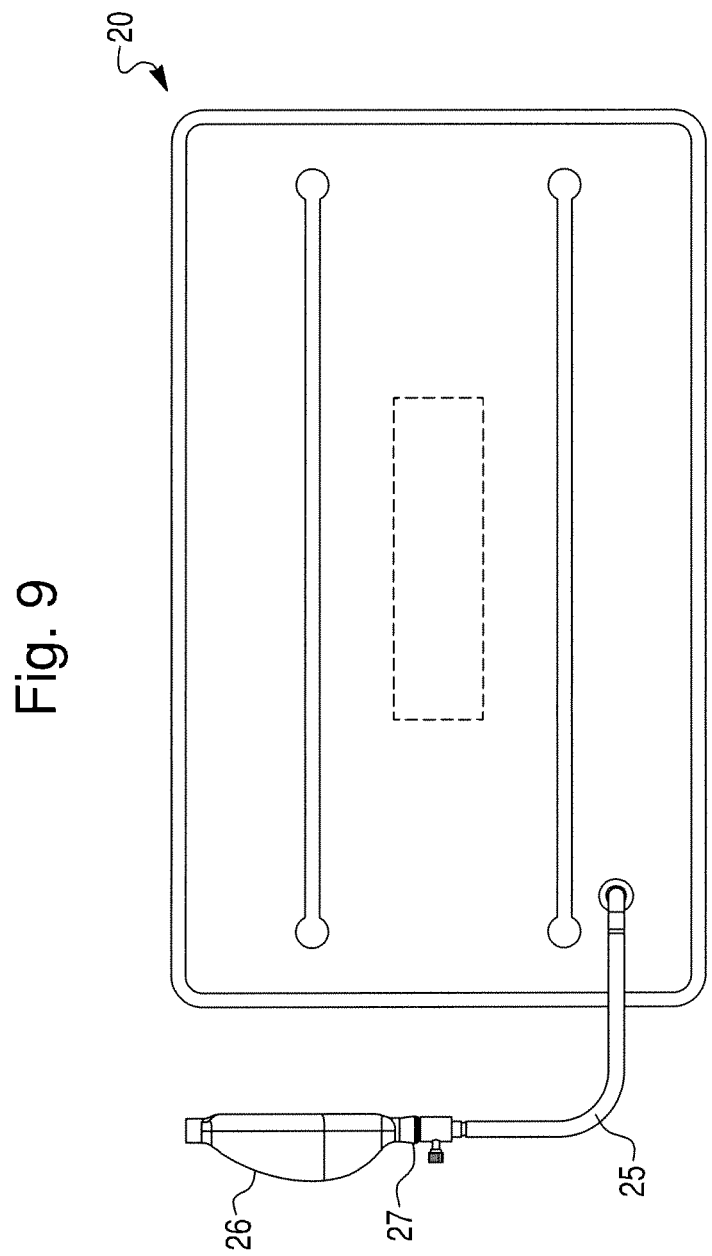
FIG. 9 is a rear view of an inflatable lumbar support bladder having an inflation bulb attached thereto, according to an embodiment of the present invention.

The cushion set 10 may further include an inflatable lumbar support 20. The inflatable lumbar support may include a lumbar support bladder 21, as shown, for example, in FIGS. 2A, 7, and 9. The lumber support bladder 21 may include a plurality of chambers 37 separated by chamber dividing portions 36. The lumbar support bladder may include an inflation tube 25 and an inflation bulb 26. One possible design of the inflation bulb 26 is shown in FIGS. 8A-8C. The inflation bulb 26 may be attached to the inflation tube 25 via a valve 27. The valve 27 may be, for example, a metal twist type valve. One end of the inflation tube 25 may be in fluid communication with the chambers 37, and the other end of the inflation tube 25 may be in fluid communication with the inflation bulb 26. When the inflation bulb is pumped, the lumbar support bladder 21 inflates. The lumbar support 20 may include a lumbar support cover 22. The lumbar support cover 22 may, for example, be made of a sheepskin or fabric material.

The lumbar support 20 may, alternatively, be a non-inflatable lumbar support. For example, the lumbar support 40 may be made of a foam material, similarly to the back cushions 40. The width of the lumbar support 20 may substantially similar to the width of the back cushion 40. For example, the width of the lumbar support may be between 90% and 110% of the width of the back cushion 40.

The lumbar support 20 may include a forward surface 23 and an opposing aft surface 24, as shown, for example, in FIGS. 2, 6, 7, and 10.

The aft surface 24 of the lumbar support 20 may include at least one attachment device 31, 32 (termed the "lumbar support attachment device"). The aft surface 24 of the lumbar support may be attachable to and removable from the forward surface 44 of at least one of the back cushions 40, via the lumbar support attachment device 31 and the back cushion forward attachment device 42. For example, the lumbar support attachment device 31 may be a strip of either the hook side of the loop side of a hook-and-loop fastener, and the back cushion forward attachment device 42 may be a strip of the other side of the hook-and-loop fastener. In addition, the aft surface 24 of the lumbar support 20 may be attachable to and removable from the upper portion 60a or lower portion 60b of the seat back 60 via the at least one lumbar support attachment device 32 and a corresponding attachment device located on the seat back 60. In the embodiment shown in FIGS. 6 and 10, the lumbar support 20 includes a first pair of attachment devices 31 configured to be attached to the back cushion forward attachment device 42, and a second pair of attachment devices 32 configured to be attached to attachment devices located on the seat back 60. To aid in alignment, the attachment device 31 may be the hook side of a hook-and-loop fastener, and the attachment device 32 may be the loop side of a hook-and-loop fastener (or vice versa). In this manner, it can be prevented that the attachment device 31 is mistakenly attached to the seat back, or the attachment device 32 is mistakenly attached to the seat cushion. In other embodiments, the lumbar support 20 may include only a single attachment device or set of attachment devices that is configured to be connected to either the back cushion forward attachment device 42 or the attachment device on the seat back 60.

Where the lumbar support includes a lumbar support cover 22, the attachment devices 31 and 32 may be located on the cover 22, as shown, for example, in FIG. 6.

Where the attachment devices 31, 32, 42, and 43 are strips of hook-and-loop fasteners, the strips may be arranged vertically, as shown in FIGS. 10 and 11, for example. The attachment devices 31, 32, 42, and 43 need not necessarily be hook-and-loop type fasteners. Rather, they may be any suitable reversible attachment devices, such as snaps, straps, loops, etc.

The cushion set 10 may be configurable in a plurality of difference configurations. For example, the cushion set may be configurable in a first configuration, in which the upper back cushion is attached to the upper portion of the seat back, the lower back cushion is attached to the lower portion of the seat back, and the lumbar support is attached to the lower back cushion, as shown in FIG. 5*a*; a second configuration, in which the lumbar support is attached directly to the seat back, without the upper back cushion and the lower back cushion, as shown in FIG. 5F; a third configuration, in which the upper back cushion is attached to the upper portion of the seat back, and the lower back cushion is attached to the lower portion of the seat back, without the lumbar support, as shown in FIG. 5B; a fourth configuration, in which the lower back cushion is attached to the lower portion of the seat back, and the lumbar support is attached to the lower back cushion, without the upper back cushion, as shown in FIG. 5C; a fifth configuration, in which the lower back cushion is attached to the lower portion of the seat back, and the lumbar support is attached directly to the upper portion of the seat back, without the upper back cushion, as shown in FIG. 5D; and a sixth configuration, in which the lower back cushion is attached to the seat back, without the upper back cushion and the lumbar support, as shown in FIG. 5E; or any subcombination of these configurations.

The back cushions 40 and/or the lumbar support 20 may include an identification region, such as a label or tag 35, as shown, for example, in FIGS. 10A, and 11E. The identification region may be located on the aft surface of the back cushions 40 and/or the lumbar support 20.

The cushion set 10 may further include a seat cushion 50, as shown in FIG. 12.

The cushion set 10 of embodiments of the present invention may be used, for example, for the seat of an aircraft (such as a helicopter), a watercraft, an over-the-road vehicle, railroad car, medical transport device (such as a wheelchair), or any other suitable application.

The cushion set 10 of embodiments of the present invention may provide several benefits over typical cushions. For example, because the cushion set 10 may be configured in multiple different configurations, individuals may tailor the installation of the cushion set 10 to suit their personal comfort, thereby reducing fatigue that can result from long period of confinement in a seat.

In addition, because the cushion set 10 may include a separate upper back cushion and lower back cushion, it is possible to accommodate individuals wearing varying clothing and equipment configurations by allowing a variable distance between the occupant and the seat back to be maintained while providing lumbar and back support. For example, in military aircraft, individuals wearing body armor can remove the upper back cushion to allow ample space for back armor plates, while maintaining the lumbar support to provide proper support to the lumbar region.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A cushion set for use with a seat having a seat back with an upper portion and a lower portion, the cushion set comprising:
    an upper back cushion and a lower back cushion each having a forward surface and an opposing aft surface, each of the forward surfaces of the back cushions comprising at least one back cushion forward attachment device, and each of the aft surfaces of the back cushions comprising at least one back cushion aft attachment device; and
    an inflatable lumbar support having an aft surface, the aft surface of the lumbar support comprising a first lumbar support attachment device and a second lumbar support attachment device, the first lumbar support attachment device being one of (i) at least one strip of a hook side of a hook-and-loop fastener and (ii) at least one strip of a loop side of a hook-and-loop fastener device, and the second lumbar support attachment device being the other of (i) the at least one strip of the hook side of a hook-and-loop fastener and (ii) the at least one strip of the loop side of a hook-and-loop fastener device,
    wherein the aft surface of the upper back cushion is attachable to and removable from the upper portion of the seat back, via the at least one back cushion aft attachment device of the upper back cushion,
    wherein the aft surface of the lower back cushion is attachable to and removable from the lower portion of the seat back, via the at least one back cushion aft attachment device of the lower back cushion,
    wherein the aft surface of the lumbar support is attachable to and removable from the forward surface of at least one of the back cushions, via the first lumbar support attachment device and the at least one back cushion forward attachment device, and
    wherein the aft surface of the lumbar support is attachable to and removable from at least one of the upper portion of the seat back and the lower portion of the seat back, via the second lumbar support attachment device.

2. The cushion set of claim 1, wherein the cushion set is configurable in:
    a first configuration, in which the upper back cushion is attached to the upper portion of the seat back, the lower back cushion is attached to the lower portion of the seat back, and the lumbar support is attached to the lower back cushion, and
    a second configuration, in which the lumbar support is attached directly to the seat back, without the upper back cushion and the lower back cushion.

3. The cushion set of claim 2, wherein the cushion set is configurable in a third configuration, in which the upper back cushion is attached to the upper portion of the seat back, and the lower back cushion is attached to the lower portion of the seat back, without the lumbar support.

4. The cushion set of claim 3, wherein the cushion set is configurable in a fourth configuration, in which the lower back cushion is attached to the lower portion of the seat back, and the lumbar support is attached to the lower back cushion, without the upper back cushion.

5. The cushion set of claim 4, wherein the cushion set is configurable in a fifth configuration, in which the lower back cushion is attached to the lower portion of the seat back, and the lumbar support is attached directly to the upper portion of the seat back, without the upper back cushion.

6. The cushion set of claim 5, wherein the cushion set is configurable in a sixth configuration, in which the lower back cushion is attached to the seat back, without the upper back cushion and the lumbar support.

7. The cushion set of claim 2, wherein the at least one back cushion forward attachment device is located in the central portion of the upper back cushion or the lower back cushion, the at least one back cushion aft attachment device comprises at least two back cushion aft attachment devices, the upper back cushion and the lower back cushion each have side portions, and at least one back cushion aft attachment device is located in each of the side portions of the upper back cushion or the lower back cushion.

8. The cushion set of claim 1, wherein the upper back cushion and the lower back cushion each includes a central portion and two side portions, the side portions extending in a forward direction at a positive angle from a plane of the central portion.

9. The cushion set of claim 1, wherein each of the attachment devices of the back cushions comprises a strip of a hook side or a loop side of a hook-and-loop fastener.

10. The cushion set of claim 9, wherein the strips are vertical strips.

11. The cushion set of claim 1, wherein the lumbar support comprises an inflatable bladder and an inflatable lumbar support cover surrounding the inflatable bladder, the first and second lumbar support attachment devices being disposed on an aft surface of the lumbar support cover.

12. The cushion set of claim 11, wherein:
the lumbar support further comprises an inflation tube, an inflation bulb, and a valve connecting the inflation tube to the inflation bulb, the inflatable bladder being inflatable using the inflation bulb, and
the lumbar support cover comprises at least one bulb attachment device configured to secure the bulb to the lumbar support cover.

13. The cushion set of claim 1, wherein the upper back cushion and the lower back cushion each comprise a foam material and a back cushion cover surrounding the foam material, that at least one back cushion forward attachment device being disposed on a forward surface of the back cushion cover, and the at least one back cushion aft attachment device being disposed on an aft surface of the cover.

14. The cushion set of claim 1, where a width of the lumbar support is substantially similar to a width of the lower back cushion.

15. The cushion set of claim 1, wherein the upper back cushion and the lower back cushion have the same shape, size, and configuration.

16. An apparatus comprising:
a seat having a seat back with an upper portion and a lower portion;
an upper back cushion and a lower back cushion each having a forward surface and an opposing aft surface, each of the forward surfaces of the back cushions comprising at least one back cushion forward attachment device, and each of the aft surfaces of the back cushions comprising at least one back cushion aft attachment device; and
an inflatable lumbar support having an aft surface, the aft surface of the lumbar support comprising a first lumbar support attachment device and a second lumbar support attachment device, the first lumbar support attachment device being one of (i) at least one strip of a hook side of a hook-and-loop fastener and (ii) at least one strip of a loop side of a hook-and-loop fastener device, and the second lumbar support attachment device being the other of (i) the at least one strip of the hook side of a hook-and-loop fastener and (ii) the at least one strip of the loop side of a hook-and-loop fastener device,
wherein the aft surface of the upper back cushion is attachable to and removable from the upper portion of the seat back, via the at least one back cushion aft attachment device of the upper back cushion,
wherein the aft surface of the lower back cushion is attachable to and removable from the lower portion of the seat back, via the at least one back cushion aft attachment device of the lower back cushion,
wherein the aft surface of the lumbar support is attachable to and removable from the forward surface of at least one of the back cushions, via the first lumbar support attachment device and the at least one back cushion forward attachment device, and
wherein the aft surface of the lumbar support is attachable to and removable from at least one of the upper portion of the seat back and the lower portion of the seat back, via the second lumbar support attachment device.

17. An aircraft seating device comprising:
a seat portion disposed in an aircraft, the seat portion having a seat back with an upper portion and a lower portion;
an upper back cushion and a lower back cushion each having a forward surface and an opposing aft surface, each of the forward surfaces of the back cushions comprising at least one back cushion forward attachment device, and each of the aft surfaces of the back cushions comprising at least one back cushion aft attachment device; and
an inflatable lumbar support having an aft surface, the aft surface of the lumbar support comprising a first lumbar support attachment device and a second lumbar support attachment device, the first lumbar support attachment device being one of (i) at least one strip of a hook side of a hook-and-loop fastener and (ii) at least one strip of a loop side of a hook-and-loop fastener device, and the second lumbar support attachment device being the other of (i) the at least one strip of the hook side of a hook-and-loop fastener and (ii) the at least one strip of the loop side of a hook-and-loop fastener device,
wherein the aft surface of the upper back cushion is attachable to and removable from the upper portion of the seat back, via the at least one back cushion aft attachment device of the upper back cushion,
wherein the aft surface of the lower back cushion is attachable to and removable from the lower portion of the seat back, via the at least one back cushion aft attachment device of the lower back cushion,
wherein the aft surface of the lumbar support is attachable to and removable from the forward surface of at least one of the back cushions, via the first lumbar support attachment device and the at least one back cushion forward attachment device, and
wherein the aft surface of the lumbar support is attachable to and removable from at least one of the upper portion of the seat back and the lower portion of the seat back, via the second lumbar support attachment device.

* * * * *